United States Patent
Kim et al.

(10) Patent No.: US 7,554,637 B2
(45) Date of Patent: Jun. 30, 2009

(54) LIQUID CRYSTAL DISPLAY PANEL AND DISPLAY APPARATUS HAVING THE SAME

(75) Inventors: Seong-ho Kim, Yongin-si (KR); Seung-gon Kang, Gyeonggi-do (KR); Chung Yi, Yongin-si (KR); Tae-hyeong Park, Yongin-si (KR); Gyung-soon Park, Yongin-si (KR)

(73) Assignee: Samsung Electronics Co., Ltd. (KR)

( * ) Notice: Subject to any disclaimer, the term of this patent is extended or adjusted under 35 U.S.C. 154(b) by 270 days.

(21) Appl. No.: 11/211,778

(22) Filed: Aug. 25, 2005

(65) Prior Publication Data

US 2006/0077334 A1    Apr. 13, 2006

(30) Foreign Application Priority Data

Aug. 27, 2004  (KR) ............. 10-2004-0068113
Oct. 13, 2004  (KR) ............. 10-2004-0081836

(51) Int. Cl.
*G02F 1/1337* (2006.01)
*G02F 1/1339* (2006.01)

(52) U.S. Cl. ..................... 349/123; 349/153

(58) Field of Classification Search .......... 349/123–125
See application file for complete search history.

(56) References Cited

U.S. PATENT DOCUMENTS 6,989,879 B1 *  1/2006  Nakahara et al. ............ 349/123

7,262,823 B2 *  8/2007  Morimoto et al. ........... 349/123

FOREIGN PATENT DOCUMENTS

| CN | 1275215 A | 11/2000 |
| CN | 1344962 A | 4/2002 |
| CN | 1346998 A | 5/2002 |
| CN | 1348115 A | 5/2002 |
| JP | 60-181730 | 9/1985 |
| JP | 09152617 | 10/1997 |
| KR | 2002-0053462 | 7/2002 |
| KR | 10-2004-0016028 | 2/2004 |

OTHER PUBLICATIONS

China Office Action; 2005100923690; dated Jul. 6, 2007.

* cited by examiner

*Primary Examiner*—Andrew Schechter
(74) *Attorney, Agent, or Firm*—Cantor Colburn LLP (57) ABSTRACT

A displaying apparatus includes a first substrate having a first orientation film, a second substrate having a second orientation film corresponding to the first orientation film, oppositely facing the first substrate, and a sealant having at least a part overlapped with circumferential regions of the orientation films, the sealant adhering the first substrate to the second substrate, wherein, in one exemplary embodiment, the circumferential regions of the orientation films overlapped with the sealant are formed with protrusions along planar directions of the substrates, thus providing a displaying apparatus having an excellent adherence between substrates and preventing a display region from being narrowed.

16 Claims, 13 Drawing Sheets

LIQUID CRYSTAL DISPLAY PANEL AND DISPLAY APPARATUS HAVING THE SAME

This application claims priority to Korean Patent Application No. 2004-0081836, filed on Oct. 13, 2004 and Korean Patent Application No. 2004-0068113, filed on Aug. 27, 2004 and all the benefits accruing therefrom under 35 U.S.C. §119, and the contents of which in their entirety are herein incorporated by reference.

BACKGROUND OF INVENTION

1. Field of the Invention

The present invention relates to a displaying apparatus, and more particularly, to a displaying apparatus having a widened display region by reducing the width of an outer black matrix.

2. Description of the Related Art

A liquid crystal display ("LCD") device is a displaying apparatus including an LCD panel. The LCD panel forms pictures thereon by controlling a light transmission rate of liquid cells arranged in a matrix format according to information on light signals.

The LCD panel includes a thin film transistor ("TFT") substrate, a color filter substrate oppositely facing the TFT substrate, and a liquid crystal layer formed in a space between the TFT substrate and the color filter substrate. Polarizing plates are adhered to external faces of both substrates.

Orientation films for orientation of liquid crystal layers are formed on the surfaces of the TFT substrate and the color filter substrate that face each other. The liquid crystal layers are formed within the circumferential regions of both substrates and positioned in a space formed by a sealant adhering both substrates. The sealant generally encloses a display region and is positioned within the region of an outer black matrix formed on the color filter substrate.

The sealant encloses the liquid crystal layer between the TFT substrate and the color filter substrate, and functions to adhere both substrates to each other. However, the orientation films made of polyamide and the sealant having an epoxy resin as a main component are not so adherent relative to each other, and thus, adherence of both substrates becomes poor when the sealant is formed on the orientation film. The poor adherence of the substrates to each other may cause several problems. For example, when a polarizing plate attached to the substrate surface is detached in the course of manufacture, the adherence between the sealant and both substrates may be damaged.

To solve this problem, the orientation films may be positioned so as not to be overlapped with the sealant, or a part of the sealant may overlap the orientation films along the lengthwise direction, however such strategies for improving adherence are liable to narrow the display region by as much as the width created by the orientation films and the sealant separated from each other.

BRIEF SUMMARY OF THE INVENTION

Accordingly, the present invention provides a displaying apparatus having an excellent adherence between substrates and preventing a display region from being narrowed. The foregoing and/or other objects and advantages of the present invention are achieved by providing a displaying apparatus including a first substrate having a first orientation film, a second substrate having a second orientation film corresponding to the first orientation film, oppositely facing the first substrate, and a sealant having at least a part overlapped with circumferential regions of the orientation films, the sealant adhering the first substrate to the second substrate, wherein the circumferential regions of the first and second orientation films overlapped with the sealant are formed with protrusions along planar directions of the first and second substrates.

According to another embodiment of the present invention, the first substrate is provided with a pad part for connection to an external circuit, and a part of the sealant positioned in the pad part does not overlap the first and second orientation films.

According to another embodiment of the present invention, a plurality of rectangular shaped protrusions are formed along at least three sides of the first and second orientation films.

According to another embodiment of the present invention, an adherence of the sealant to the first and second substrates when the sealant is positioned adjacent gaps between the protrusions is greater than an adherence of the sealant to the first and second substrates when the sealant is positioned adjacent the protrusions.

According to another embodiment of the present invention, the displaying apparatus further includes a gap between each adjacent pair of protrusions, at least one gap having a width greater than a width of each protrusion.

The foregoing and/or other objects and advantages of the present invention are also achieved by providing a displaying apparatus including a first substrate having a pad part for connection to an external circuit, a second substrate oppositely facing the first substrate, a sealant positioned between an outer circumferential region of the first substrate and the second substrate, the sealant adhering the first substrate to the second substrate, and an outer black matrix formed on the outer circumferential region of one of the first and second substrates, wherein a width of the outer black matrix corresponding to at least a part of the outer circumferential region is different from a width of the outer black matrix corresponding to another part of the outer circumferential region.

According to another embodiment of the present invention, the outer black matrix is formed on the second substrate.

According to yet another embodiment of the present invention, the displaying apparatus further includes an orientation film interposed between the outer black matrix and the sealant. The outer black matrix includes a first outer black matrix having a first width and a second outer black matrix having a second width narrower than the first width, and the orientation film is interposed on at least a region between the second outer black matrix and the sealant.

According to yet another embodiment of the present invention, a circumferential region of the orientation film is formed with protrusions in planar directions of the first and second substrates.

According to yet another embodiment of the present invention, the first outer black matrix is positioned in an area of the displaying apparatus corresponding to the pad part.

According to yet another embodiment of the present invention, the sealant positioned adjacent the second outer black matrix is positioned completely on a circumferential region of the orientation film.

According to yet another embodiment of the present invention, the second outer black matrix is positioned in an area surrounding three sides of a display region of the displaying apparatus.

According to yet another embodiment of the present invention, the sealant positioned adjacent the first outer black matrix does not overlap the orientation film.

The foregoing and/or other objects and advantages of the present invention are also achieved by providing a displaying apparatus including a liquid crystal display panel having a first substrate having a first orientation film, a second substrate having a second orientation film, a liquid crystal layer positioned between the first orientation film and the second orientation film, and a sealant adhering the first substrate to the second substrate and enclosing the liquid crystal layer therein, a first portion of the sealant overlapping the first and second orientation films and a second portion of the sealant not overlapping the first and second orientation films.

According to another embodiment of the present invention, the first portion of the sealant surrounds three sides of a display region of the liquid crystal display panel, and the second portion of the sealant is provided adjacent a pad part of the liquid crystal display panel connecting to an external circuit.

According to another embodiment of the present invention, an adherence of the sealant in the first portion is less than an adherence of the sealant in the second portion.

According to another embodiment of the present invention, the first and second orientation films includes a circumferential region having a plurality of protrusions, the first portion of the sealant overlapping the protrusions, and the second portion of the sealant overlapping gaps between the protrusions.

According to another embodiment of the present invention, the liquid crystal display panel further includes an outer black matrix formed on an outer circumferential region of the second substrate, the outer black matrix comprising a first outer black matrix having a first width and a second outer black matrix having a second width less than the first width, the second outer black matrix surrounding three sides of a display region of the liquid crystal display panel.

According to another embodiment of the present invention, a cross-section of the sealant includes both the first portion of the sealant and the second portion of the sealant.

BRIEF DESCRIPTION OF THE DRAWINGS

The above and other objects and features of the present invention will become apparent from the following description of preferred embodiments given in conjunction with the accompanying drawings, in which.

DETAILED DESCRIPTION OF THE INVENTION

A displaying apparatus according to the present invention herein refers to a liquid crystal display ("LCD"). In the drawings, the thickness of layers, films, and regions are exaggerated for clarity. Like numerals refer to like elements throughout. It will be understood that when an element such as a layer, film, region, or substrate is referred to as being "on" another element, it can be directly on the other element or intervening elements may also be present.

An LCD panel according to a first exemplary embodiment of the present invention will be described with reference to FIGS. 1 to 4.

Figure 1:
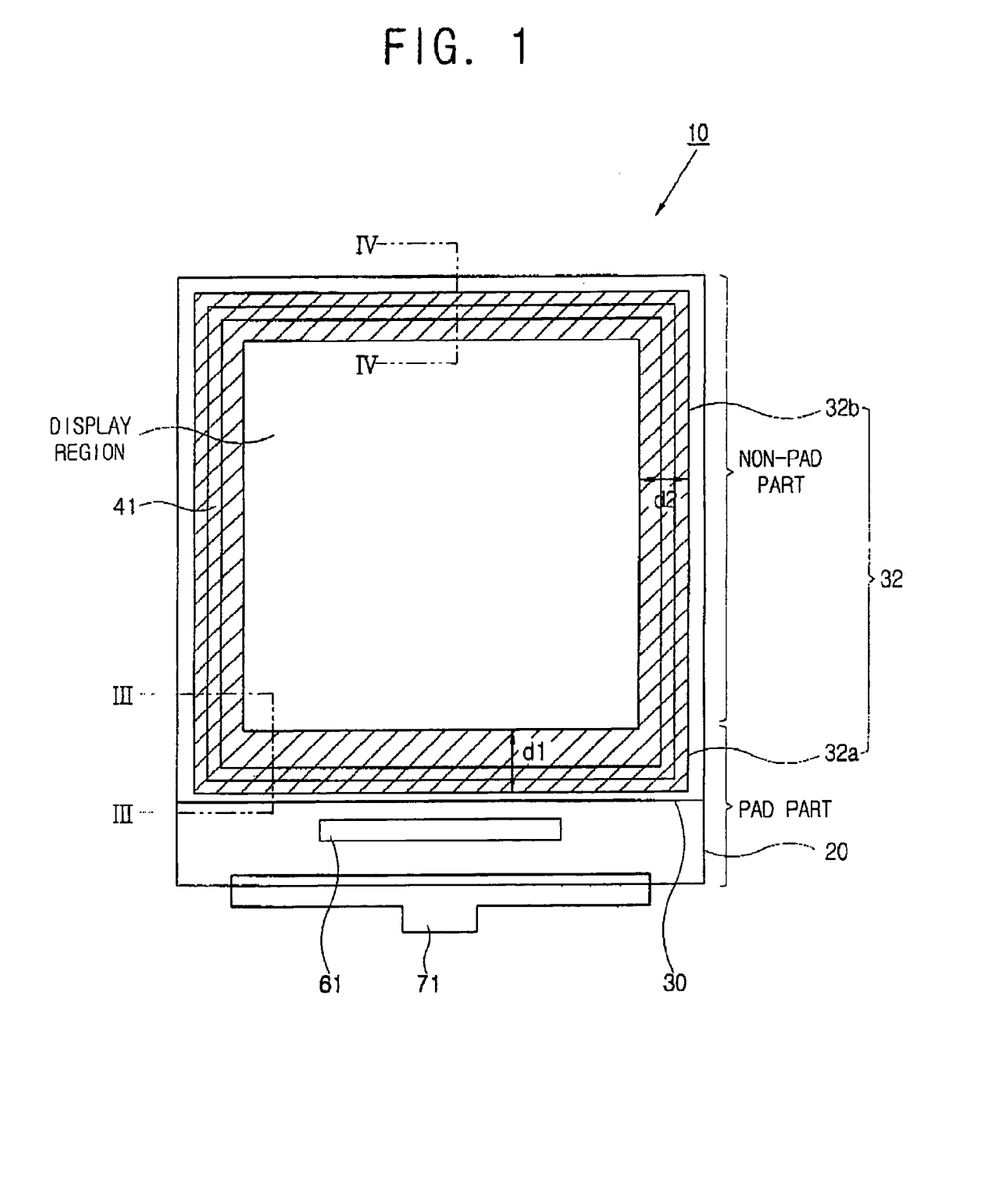
FIG. 1 is a diagram illustrating a first exemplary embodiment of an arrangement of a liquid crystal display ("LCD") panel according to the present invention.
Figure 2:
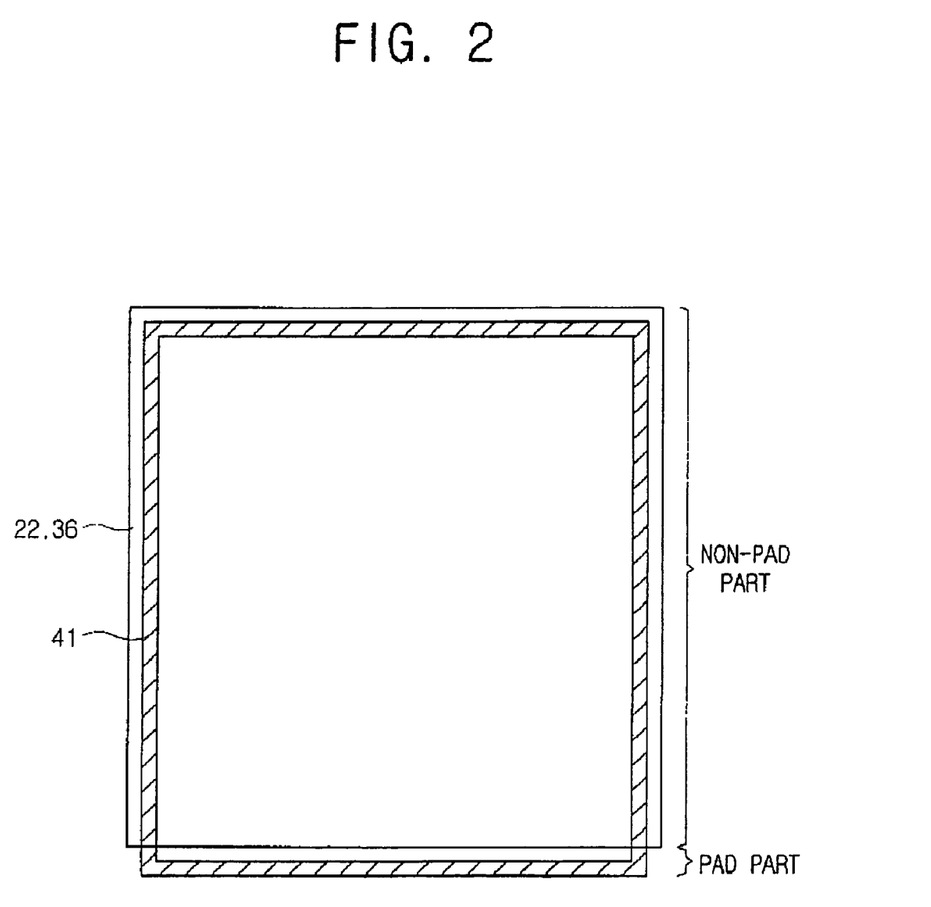
FIG. 2 is a top plan view illustrating the first exemplary embodiment of an arrangement of orientation films and a sealant according to the present invention.
Figure 3:
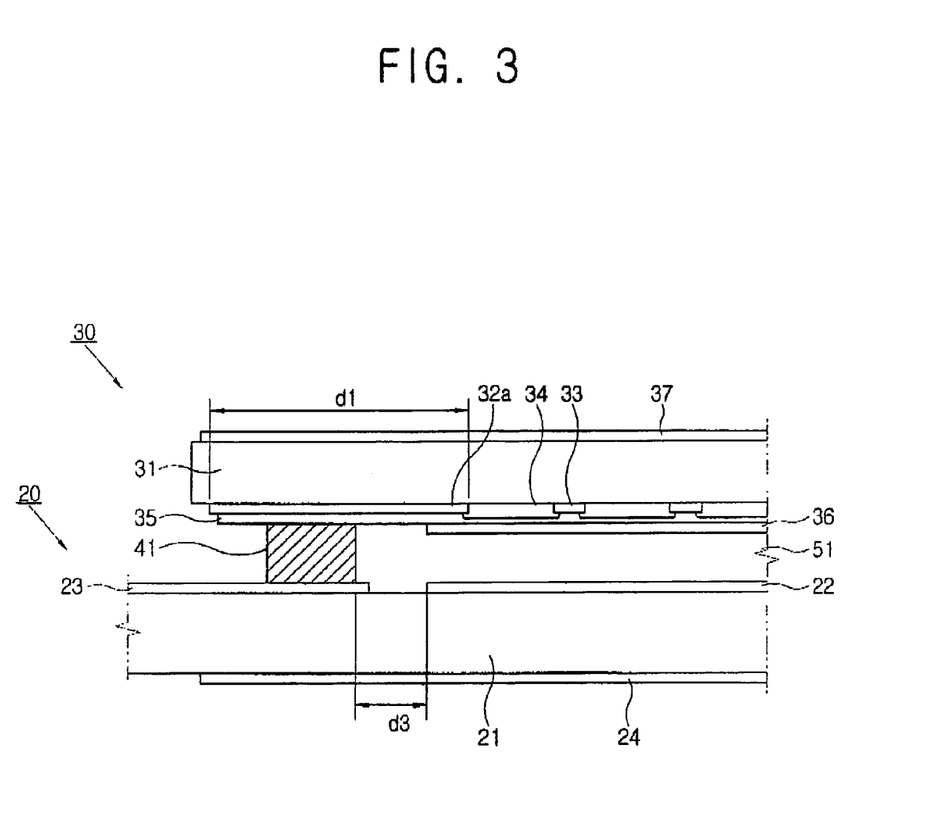
FIG. 3 is a sectional view taken along line III-III of FIG. 1.
Figure 4:
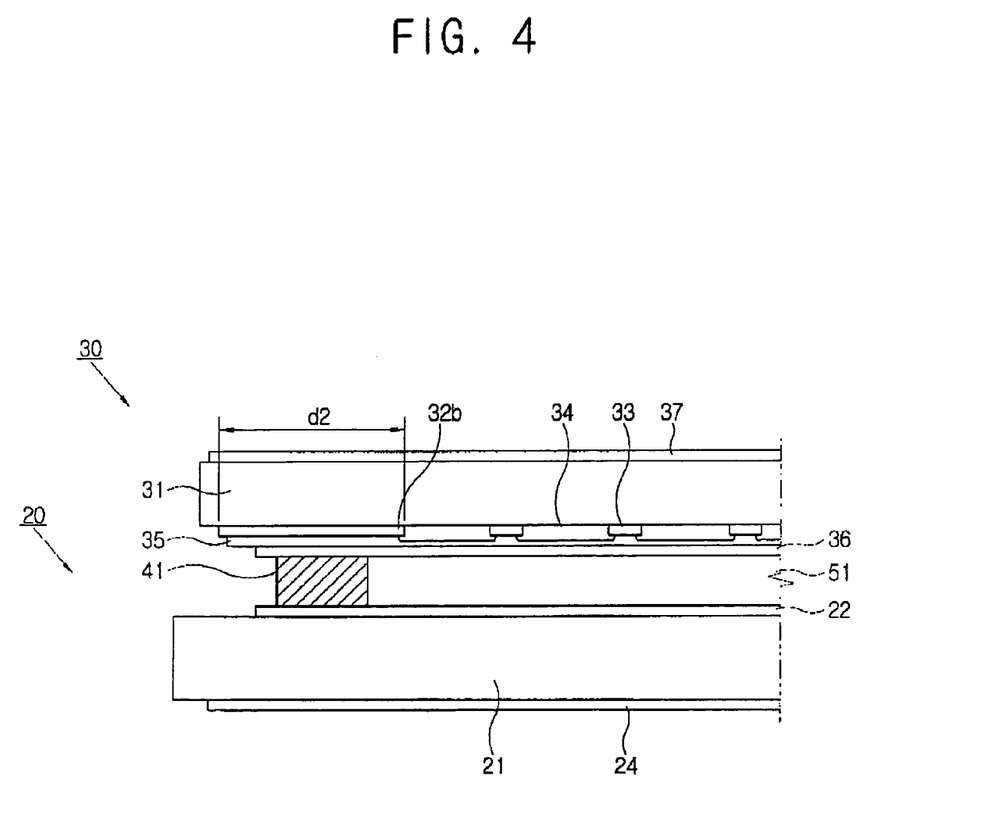
FIG. 4 is a sectional view taken along line IV-IV of FIG. 1.

FIG. 1 is a diagram illustrating a first exemplary embodiment of an arrangement of an LCD panel according to the present invention, FIG. 2 is a top plan view illustrating the first exemplary embodiment of an arrangement of orientation films and a sealant according to the present invention, FIG. 3 is a sectional view taken along line III-III of FIG. 1, and FIG. 4 is a sectional view taken along line IV-IV of FIG. 1.

The LCD panel 10 includes a first substrate 20 on which a plurality of thin film transistors ("TFTs") are formed (not shown), a second substrate 30 on which a color filter layer 34 is formed, and a liquid crystal layer 51 sealed with a sealant 41 in a space between the first substrate 20 and the second substrate 30.

The first substrate 20 includes a first substrate material 21, a first orientation film 22 formed on a top of the first substrate material 21 facing the second substrate 30, and a pad electrode 23 receiving signals transmitted from a driving circuit 61. Further, a TFT, a pixel electrode layer electrically connected to the TFT, and so on, which are herein not shown, are positioned between the first substrate material 21 and the first orientation film 22. The pad electrode 23 is connected to each pixel, transmitting signals from the driving circuit 61 to the TFT of the first substrate 20 and a common electrode layer of the second substrate 30.

The first substrate 20 is wider than the second substrate 30, such that the driving circuit 61 may be mounted thereon to drive each of the pixels within the display region. According to this, the first substrate 20 comprises a pad part on which the pad electrode 23 is formed for connection to the driving circuit 61, and a non-pad part.

The driving circuit 61 may be connected to the first substrate 20 through various methods such as chip on glass ("COG"), chip on film ("COF"), etc. The driving circuit 61 is also connected to a flexible printed circuit board 71 ("FPCB").

The second substrate 30, opposite the first substrate 20, is somewhat smaller than the first substrate 20.

An outer black matrix 32 and a black matrix 33 are formed on the surface of a second substrate material 31 facing the first substrate 20. The outer black matrix 32 encloses the display region, which is larger in width than the black matrix 33. The outer black matrix 32 comprises a first outer black matrix 32a formed on the pad part region and a second outer black matrix 32b formed on the non-pad part region. It should be understood that the first outer black matrix 32a and the second outer black matrix 32b may be integrally formed portions of the same outer black matrix 32, and that they are sections of the outer black matrix 32 located in different areas of the LCD panel 10. The black matrix 33 generally discriminates red, green, and blue pixels, functioning to block direct light illumination to the TFT positioned in the first substrate 20. The black matrix 33 may include a photosensitive organic material to which black pigment is added, such as, but not limited to, carbon black or titanium oxide.

The color filter layer 34 is formed with a red filter, a green filter, and a blue filter disposed alternately between the black matrices 33. The color filter layer 34 gives a color to the light illuminated from a backlight unit (not shown) and then passes through the liquid crystal layer 51. The color filter layer 34 includes a photosensitive organic material.

Overcoat films 35 are formed on the color filter layer 34 and on portions of the black matrix 33 not covered by the color filter layer 34. The overcoat films 35 protect the color filter layer 34. Generally acryl-epoxy materials are used for the overcoat films 35, however other materials capable of performing similar protecting functions would be within the scope of these embodiments.

A second orientation film 36 is formed on the overcoat film 35, such as between the overcoat film 35 and the LC layer 51. A common electrode layer (not shown) is positioned between the overcoat film 35 and the second orientation film 36.

The first orientation film 22 and the second orientation film 36 are positioned opposite to each other, and separated by the LC layer 51. In a manufacturing process of the orientation films 22 and 36, after a polymic acid reacting a diamine compound and an anhydride in a solvent is printed on each of the first and second substrates 20 and 30, a polyimide is made by drying, heating, and curing the polymic acid, and the resultant polyamide is rubbed to thereby complete the orientation films 22 and 36. Rubbing is done by winding a round roll with a rubbing cloth and rotating it at high speed, thereby allowing the rubbing cloth to contact the orientation films 22 and 36. Through these processes, the orientation films 22 and 36 are each transformed to have a structure of arranging liquid crystal molecules in a constant direction.

A first polarizing plate 24 and a second polarizing plate 37 are attached to respective exterior surfaces of the substrates 20 and 30. That is, the first polarizing plate 24 is positioned on a surface of the first substrate 20 that faces away from the second substrate 30, and the second polarizing plate 37 is positioned on a surface of the second substrate 30 that faces away from the first substrate 20. Polarization directions of light from the polarizing plates 24 and 37 are generally orthogonal relative to each other. The polarizing plates 24 and 37 function to selectively transmit only an oscillation component of the light in a specific direction.

A sealant 41 is formed on the region of the outer black matrix 32 formed along the circumferences of both substrates 20 and 30. The sealant 41 adheres both substrates 20 and 30 to each other. The sealant 41 includes an amine curing agent having epoxy resin as a main component, a filling agent such as alumina or powder, or a solvent such as prophylene-glycol-diacetate. In addition to adhering both substrates 20 and 30, the sealant 41 also functions to determine a spacing between both substrates 20 and 30.

The sealant 41 is formed through a process of coating the sealant 41 on the second substrate 30 on which the second orientation film 36 is formed, a process of adhering the second substrate 30 to the first substrate 20 and providing a space into which liquid crystal can be injected, a precuring process to remove solvent from the sealant 41, and a process of thermosetting the epoxy resin. Alternatively, the sealant may be formed through a process of coating the sealant 41 on the first substrate 20 on which the first orientation film 22 is formed, and a process of adhering the first substrate 20 to the second substrate 30, prior to injecting the liquid crystal between the first and second substrates 20, 30. In the above coating process, a method of inserting the sealant 41 into a syringe and then coating the sealant 41 while moving the syringe may also be used.

Referring to FIG. 2, the sealant 41 is positioned outside the orientation films 22 and 36 in the pad part whereas the sealant 41 is positioned inside the orientation films 22 and 36 in the non-pad part. This influences the width of the outer black matrix 32, which will be described in detail with reference to FIGS. 3 and 4.

Referring to FIGS. 3 and 4, it is shown that the width of the first outer black matrix 32a in the pad part region is different from that of the second outer black matrix 32b in the non-pad part region. FIG. 3, which demonstrates a cross-section within the pad part, illustrates the sealant 41 outside of the first and second orientation films 22, 26. Instead, the sealant 41 is positioned between the overcoat films 35 and the pad electrode 23. On the contrary, as illustrated in the cross-section of the non-pad part shown in FIG. 4, the sealant 41 is positioned between the first and second orientation films 22, 36. Thus, the width d1 of the first outer black matrix 32a in the pad part region is larger than the width d2 of the second outer black matrix 32b in the non-pad part region, as will be further described below.

For this purpose, a process of adhering polarizing plates 24 and 37 will first be described.

Prior to attaching the polarizing plates 24 and 37 to the first and second substrates 20, 30, and after both substrates 20 and 30 are adhered to each other by the sealant 41, a scribing process for cutting the substrates 20 and 30 into desired sizes and a liquid crystal injecting process are performed. Upon completing both processes, the polarizing plates 24 and 37 are attached to external surfaces of both substrates 20 and 30. The polarizing plates 24 and 37 may be attached to the external surfaces of the substrates 20, 30 by allowing the liquid crystal display panel 10 to pass between rollers.

However, in the process of adhering the polarizing plates 24 and 37, a poor adherence may occur due to an existence of a foreign matter between the polarizing plates 24 and 37 and each of the substrates 20 and 30 or because of a possible defect of the polarizing plates 24 and 37. The cause of such poor adherence may be due to foreign matter, such as a glass chip, a floating matter of the sealant 41, or a particle floating in the air. If such poor adherence occurs, either or both of the polarizing plates 24 and 37 having the problem may be detached and again adhered after removing the foreign matter, so as to reuse the liquid crystal display panel 10. Detachment of the polarizing plates 24 and 37 is usually done by hand. When the second polarizing plate 37 is detached, it is detached from the second substrate material 31 while supporting the pad part region of the first substrate 20. In this course of action, the first substrate 20 and the second substrate 30 are applied with forces in opposite directions, and the forces are concentrated on the sealant 41 in the pad part direction.

The forces applied to the first and the second substrates 20 and 30 in the opposite directions should be less than the adhesive strength of adhering the sealant 41 to both substrates 20 and 30, so as to prevent any problem from being caused in the detachment process. That is, removal of either polarization plate 24, 37 to correct an adherence problem of the polarization plates 24, 37 to the substrates 20, 30 should not also disengage the sealant 41 from the first and second substrates 20, 30.

In the first exemplary embodiment of the present invention as illustrated in FIG. 3, the sealant 41 positioned in the pad part does not overlap regions of the orientation films 22 and 36. As previously described, adherence between the orientation films 22, 36 and the sealant 41 is not as strong as between the sealant 41 and other elements of the LCD panel 10. Since the sealant 41 is not formed on the regions of the orientation films 22 and 36 in the pad part, the adhesive strength between the sealant 41 and each of the substrates 20 and 30 is excellent within the pad part. Thus, the liquid crystal display panel 10 according to the first exemplary embodiment of the present invention has no problem in the pad part when the second polarizing plate 37 is detached for correcting an adherence problem between the second polarizing plate 37 and the second substrate 30.

On the other hand, in the non-pad part region, the sealant 41 is provided in regions of the orientation films 22 and 36 as illustrated in FIG. 4. In other words, the sealant 41 overlaps the regions of the orientation films 22 and 36 by as much as the width of the sealant 41. Accordingly, the adhesive strength between the sealant 41 and each of the substrates 20 and 30 in the non-pad part region is relatively weaker than the adhesive strength between the sealant 41 and each of the substrates 20 and 30 in the pad part region. However, since the force is concentrated only on the pad part region during the detachment process of the second polarizing plate 37 from the second substrate 30, formation of the sealant 41 on the orientation films 22 and 36 is not as critical in the non-pad part region.

Referring again to FIGS. 3 and 4, it is shown that a first width d1 of the first outer black matrix 32a in the pad part is larger than a second width d2 of the second outer black matrix 32b in the non-pad part because the pad part needs a separation distance d3 in consideration of a misalignment between the sealant 41 and each of the substrates 20 and 30. Accordingly, the width d2 of the second outer black matrix 32b in the non-pad part region is smaller by a distance d3 than the width d1 of the first outer black matrix 32a in the pad part region, and the area of the display region can be widened by the distance d3 along the edges of the display region within the non-pad part, as shown in FIG. 1.

According to the first exemplary embodiment of the present invention as described above, the sealant 41 and each of the orientation films 22 and 36 do not overlap in the pad part region, thereby enhancing the adhesive strength between the sealant 41 and the first and second substrates 20 and 30 within the pad part region so as to prevent a problem from occurring between the sealant 41 and the substrates 20, 30 when detaching the second polarizing plate 37 from the second substrate 30. Also, because the sealant 41 and each of the orientation films 22 and 36 overlap with each other in the non-pad part region, the display region is widened. Thus, any problem may be prevented regarding the possible detachment of the second polarizing plate 37 and the area of the display region may be advantageously widened as much as possible.

A second exemplary embodiment of the present invention will be described with reference to FIGS. 5 and 6.

Figure 5:
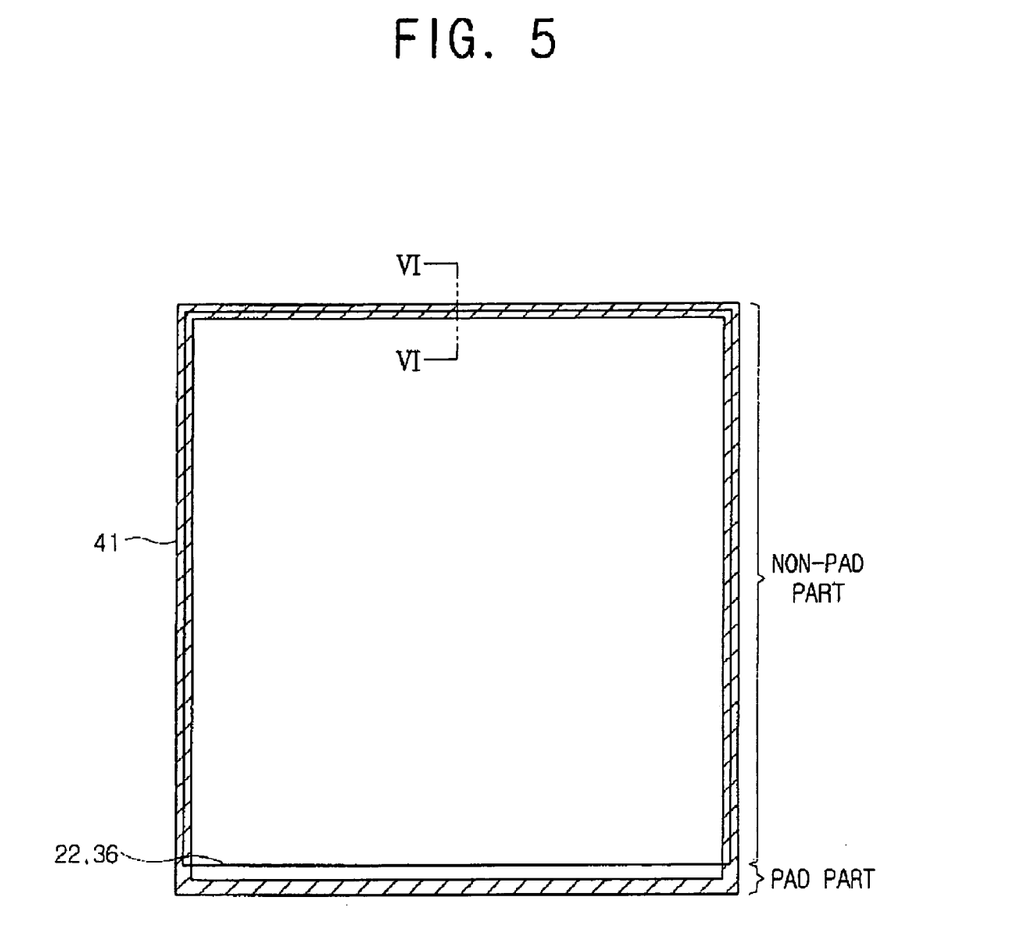
FIG. 5 is a top plan view illustrating a second exemplary embodiment of an arrangement of orientation films and a sealant according to the present invention.
Figure 6:
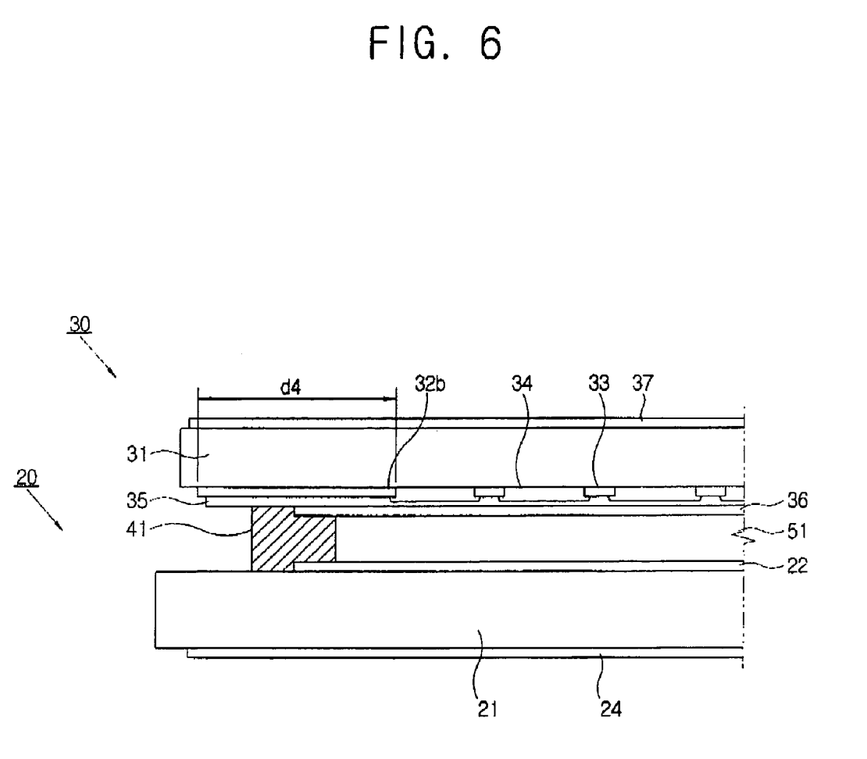
FIG. 6 is a sectional view taken along line VI-VI of FIG. 5.

FIG. 5 is a top plan view illustrating a second exemplary embodiment of an arrangement of an orientation film and a sealant according to the present invention, and FIG. 6 is a sectional view taken along line VI-VI of FIG. 5.

Referring to FIG. 5, it is shown that the sealant 41 is positioned outside the orientation films 22 and 36 in the pad part as in the first exemplary embodiment whereas a part of the sealant 41 overlaps the orientation films 22 and 36 along the lengthwise direction in the non-pad part, which will be further described with respect to FIG. 6.

In FIG. 6, which demonstrates a cross-sectional view of a portion of the non-pad part region, only a part of the sealant 41 is overlapped with the regions of the orientation films 22 and 36 whereby the adhesive strength between the sealant 41 and both substrates 20 and 30 in the non-pad part is enhanced as compared to the first exemplary embodiment where the sealant 41 is completely overlapped with the orientation films 22 and 36 in the non-pad part region. However, the width d4 of the second outer black matrix 32b of the second exemplary embodiment may be slightly enlarged as compared to the width d2 of the second outer black matrix 32b of the first exemplary embodiment. Thus, the display region of the second exemplary embodiment may be slightly smaller than the display region of the first exemplary embodiment.

A third exemplary embodiment of the present invention will be described with reference to FIGS. 7 to 9.

Figure 7A:
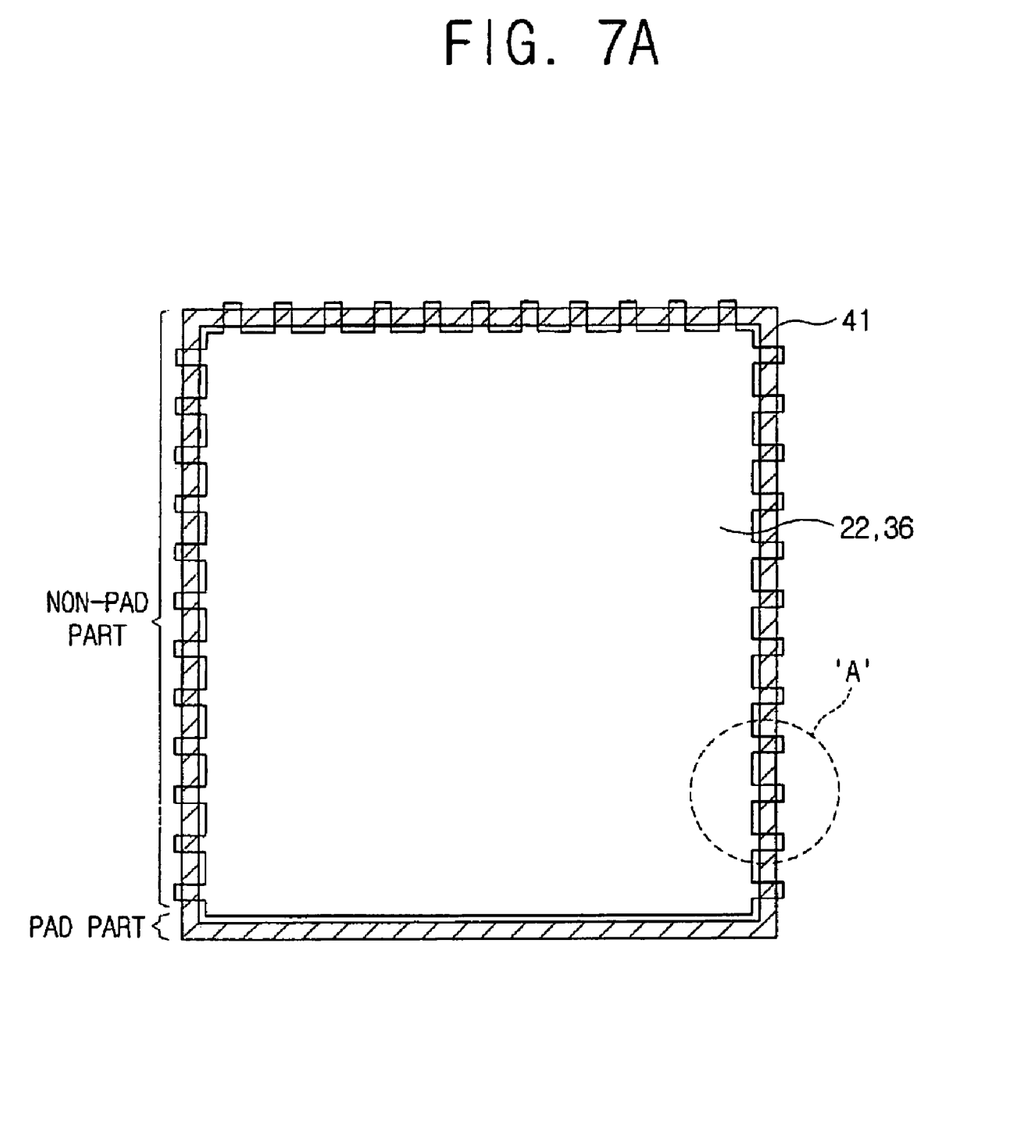
FIG. 7A is a top plan view illustrating a third exemplary embodiment of an arrangement of orientation films and a sealant according to the present invention.
Figure 7B:
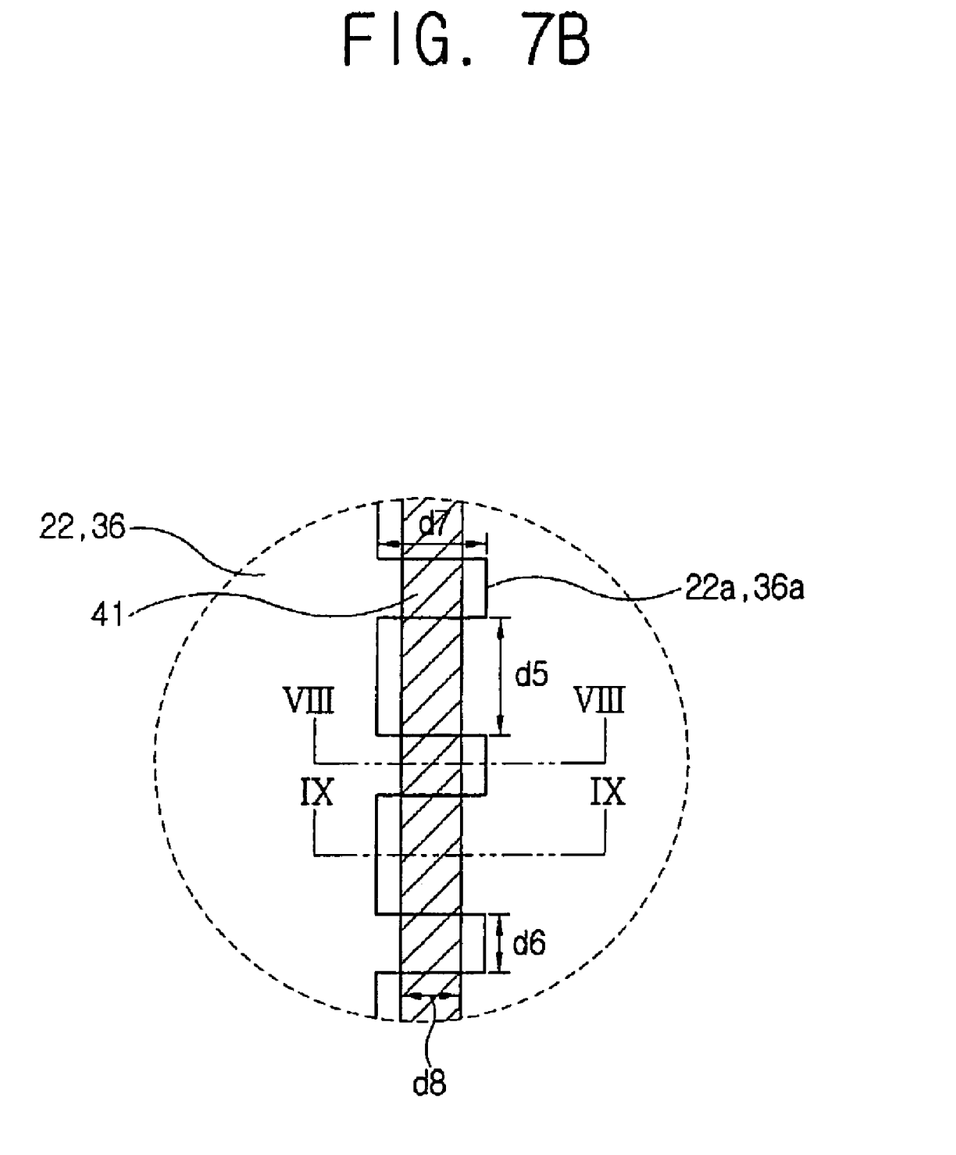
FIG. 7B is an enlarged view of portion A from FIG. 7A.
Figure 8:
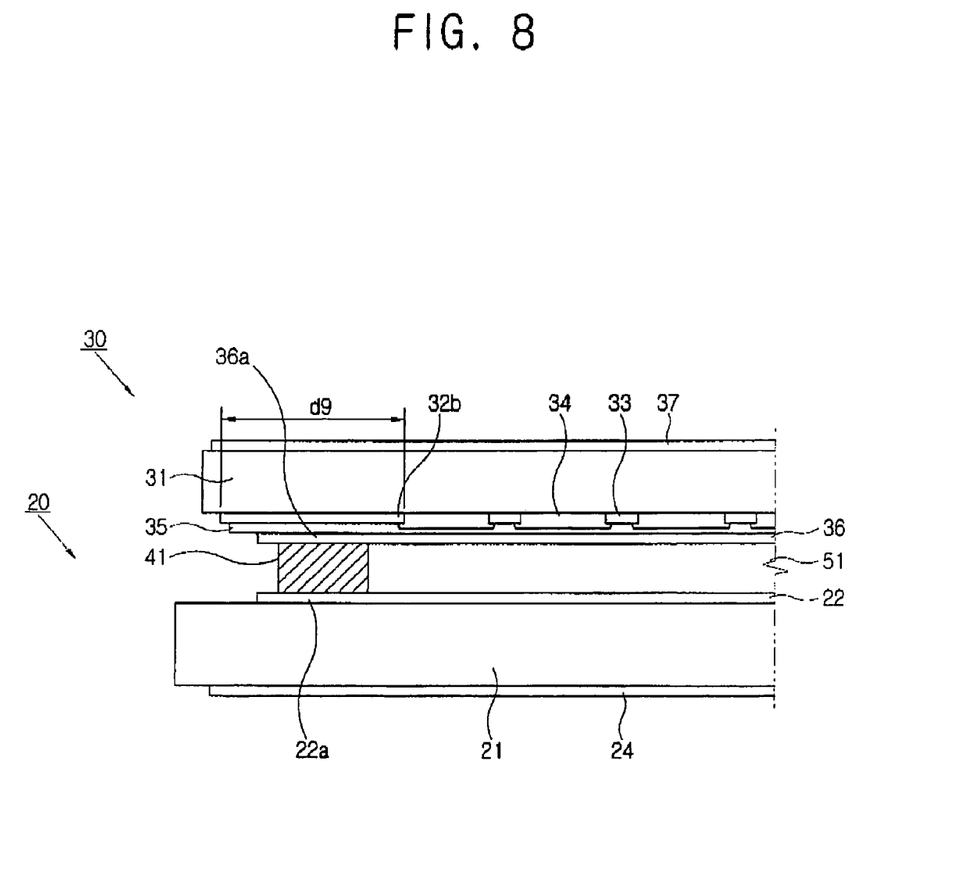
FIG. 8 is a sectional view taken along line VII-VII of FIG. 7B.
Figure 9:
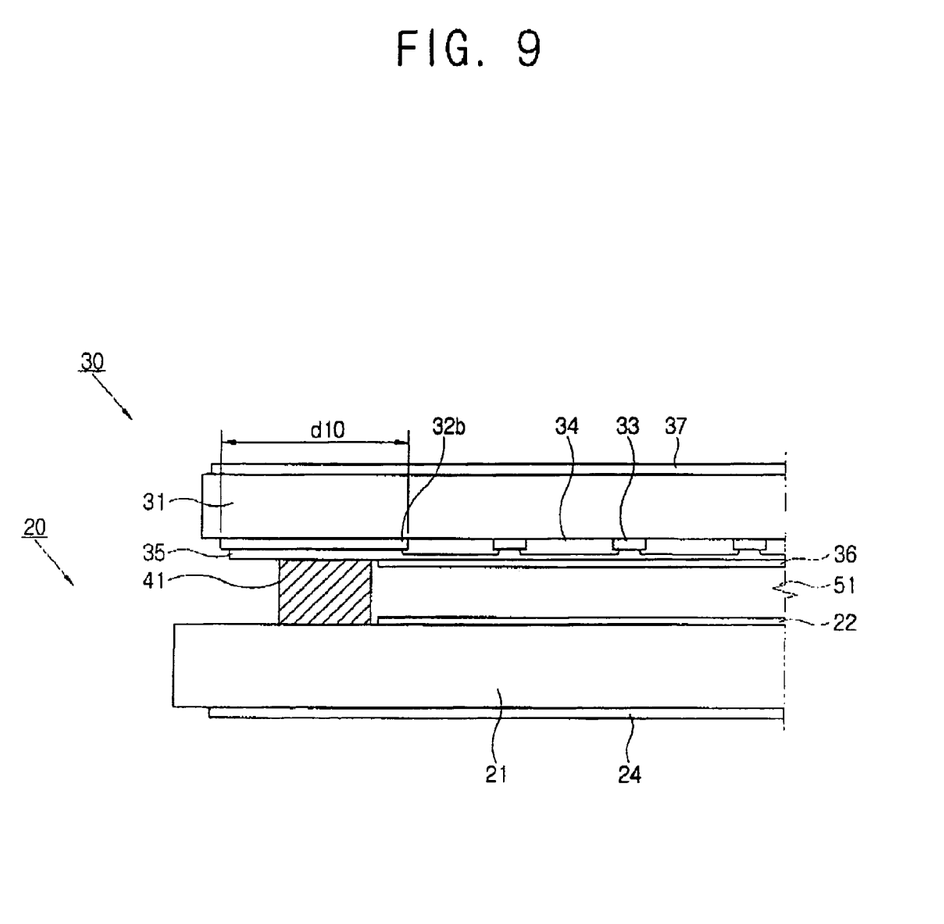
FIG. 9 is a sectional view taken along line IX-IX of FIG. 7B.

FIG. 7A is a top plan view illustrating a third exemplary embodiment of an arrangement of an orientation film and a sealant according to the present invention, FIG. 7B is an enlarged view of portion A from FIG. 7B, FIG. 8 is a sectional view taken along line VIII-VIII of FIG. 7B, and FIG. 9 is a sectional view taken along line IX-IX of FIG. 7B.

Referring to FIGS. 7A and 7B, it is shown that the sealant 41 is positioned outside the orientation films 22 and 36 in the pad part as in the first and second exemplary embodiments whereas, in this third exemplary embodiment, protrusions 22a and 36a in the planar directions of both substrates 20 and 30 are formed along the circumferences of the orientation films 22 and 36 in the non-pad part and the sealant 41 is put across the protrusions 22a and 36a. The protrusions 22a and 36a are perpendicular to the lengthwise direction of the sealant 41.

The circumferential regions of the orientation films 22 and 36 within the non-pad part are irregular or indented in shape because of the protrusions 22a and 36a of the orientation films 22 and 36. The part of the sealant 41 overlapped with the protrusions 22a and 36a, formed on the non-pad part, has a poor adhesive strength between both substrates 20 and 30. However, the part of the sealant 41 not overlapped with the protrusions 22a and 36a, such as the part of the sealant 41 located over the gaps between the protrusions 22a and 36a, has an excellent adhesive strength between both substrates 20 and 30.

The width d6 of the protrusions 22a and 36a and the distance d5 of the gaps between the protrusions 22a and 36a may be adjusted according to the adhesive strength as necessary, but the distance d5 of the gaps between the protrusions 22a and 36a is desirably around twice the width d6 of the protrusions 22a and 36a. In addition, the distance d5 of the gaps between the protrusions 22a and 36a may be somewhat larger than the width d8 of the sealant 41.

The protrusions 22a and 36a are not limited in shape as long as the sealant 41 is intermittently overlapped with the orientation films 22 and 36 along the lengthwise direction of the sealant 41. That is, the protrusions 22a and 36a may have shapes other than the rectangular shapes shown.

FIG. 8 shows that the sealant 41 overlaps the protrusions 22a and 36a in the non-pad part as demonstrated by the sealant 41 located between the first and second orientation films 22, 36, and FIG. 9 shows that the sealant 41 is positioned over the gaps between the protrusions 22a and 36a in the non-pad part, such that the sealant 41 is not located between the first and second orientation films 22, 36 when the sealant is positioned within the gaps. The relation of the sealant 41 to the orientation films 22 and 36 in FIG. 9 is similar to the relation thereof as shown in FIG. 3. However, the width d10 of the second outer black matrix 32b is identical to, or substantially the same as, the width d9 of the second outer black matrix 32b in FIG. 8, which is considerably narrower than the width d1 of the second outer black matrix 32b in FIG. 3. This is because there is no need to consider misalignment in the process of adhering both substrates 20 and 30 where the protrusions 22a and 36a are formed on the circumferential regions of the orientation films 22 and 36. In other words, since the sealant 41 positioned between the protrusions 22a and 36a serves to increase the adhesive strength between both substrates 20 and 30 within the non-pad part, there is not a need to be concerned with preventing the sealant 41 and the orientation films 22 and 36 from overlapping with each other in the pad part.

According to the third exemplary embodiment, the adhesive strength between both substrates 20 and 30 is increased in the pad part since the sealant 41 does not overlap the orientation films 22 and 36, as in the prior embodiments. Furthermore, with respect to the third exemplary embodiment, the adhesive strength between both substrates 20 and 30 may be increased in the non-pad part by partially overlapping the sealant 41 and both substrates 20 and 30 while maintaining narrow widths d9 and d10 of the second outer black matrix 32b, thus providing an increased area for a display region.

A fourth exemplary embodiment of the present invention will be described with reference to FIGS. 10 and 11.

Figure 10:
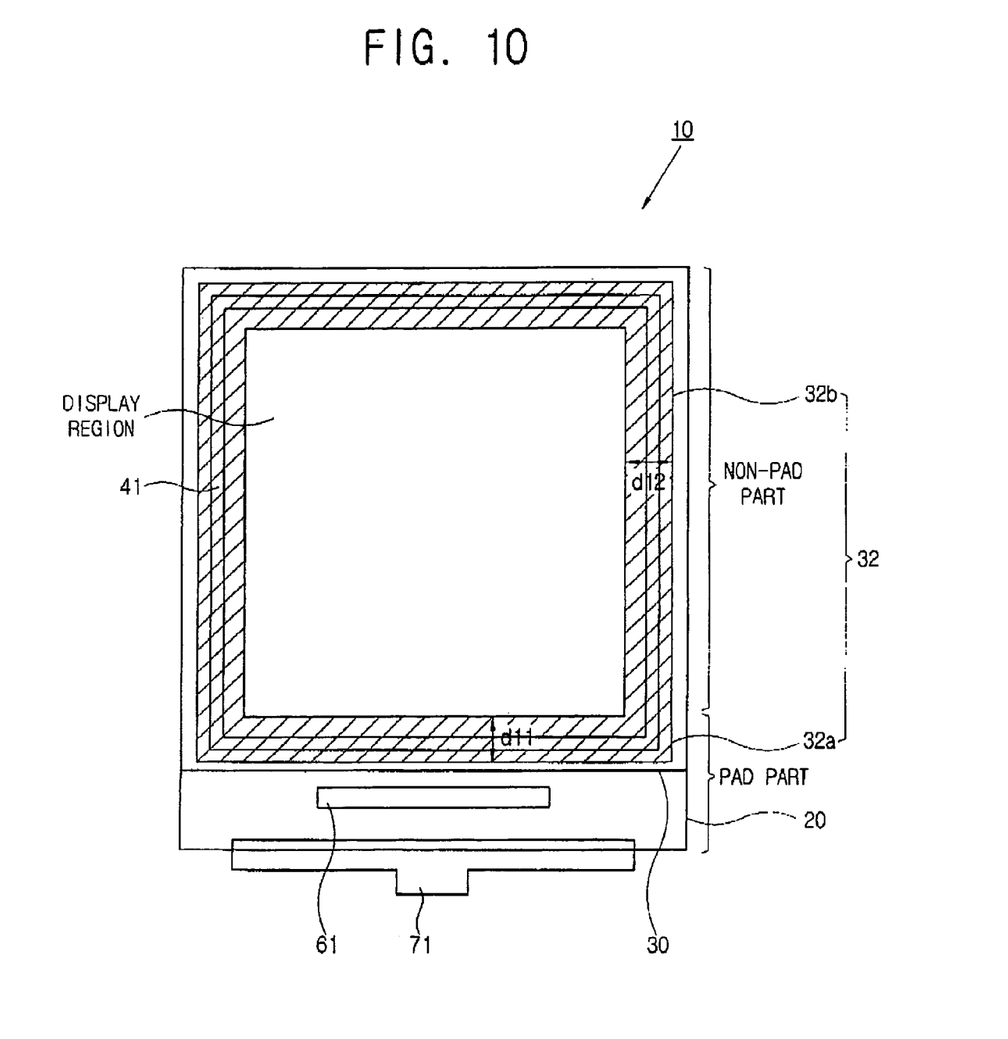
FIG. 10 is a diagram illustrating a fourth exemplary embodiment of an arrangement of a liquid crystal display panel according to the present invention.
Figure 11:
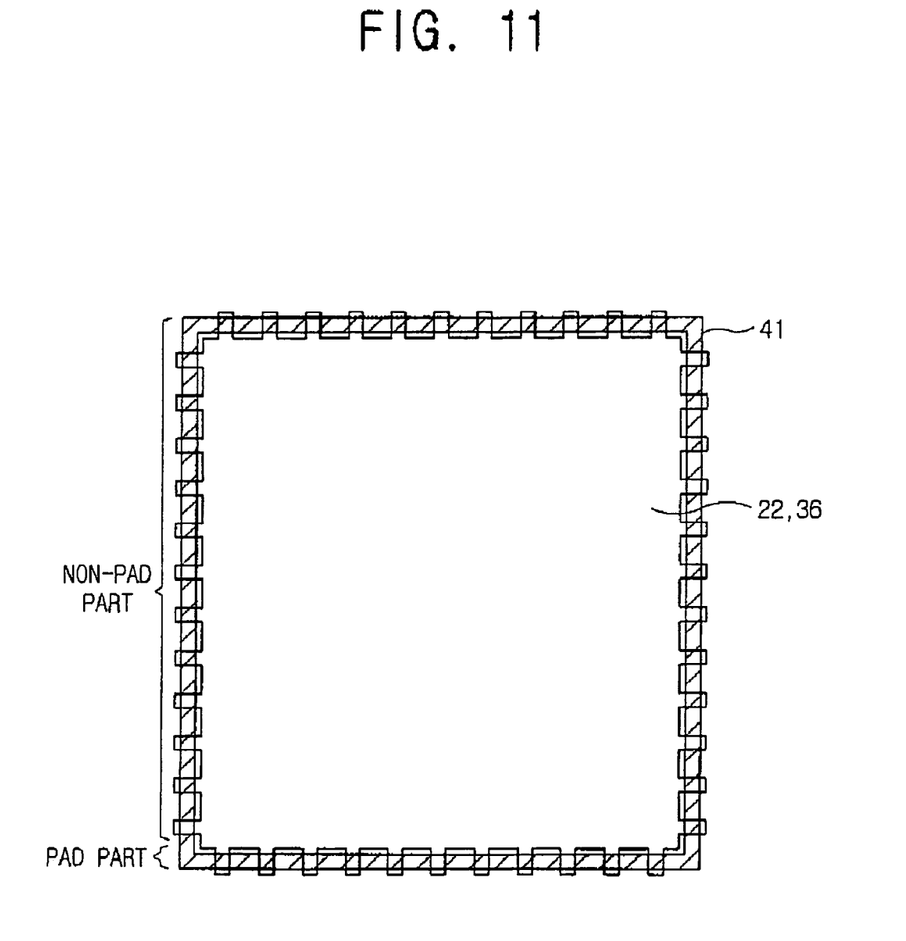
FIG. 11 is a top plan view illustrating the fourth exemplary embodiment of an arrangement of orientation films and a sealant according to the present invention.

FIG. 10 is a diagram illustrating a fourth exemplary embodiment of an arrangement of a liquid crystal display panel according to the present invention, and FIG. 11 is a top plan view illustrating the fourth exemplary embodiment of an arrangement of an orientation film and a sealant according to the present invention.

In the liquid crystal display panel employing the fourth exemplary embodiment, the width d11 of the first outer black matrix 32a of the pad part is identical to, or at least substantially the same as, the width d12 of the second outer black matrix 32b of the non-pad part. This is because the entire circumferential regions of the orientation films 22 and 36 are formed with irregular shapes as in FIG. 11 and the sealant 41 is positioned along the circumferential regions. The irregular shapes may take the form of the protrusions 22a, 36a and their intermittent gaps as previously described with respect to the third exemplary embodiment, and may alternatively embody other irregular shapes such as, but not limited to, zig zag, triangular, curvilinear, jagged, etc.

According to the fourth exemplary embodiment, the adhesive strength between both substrates 20 and 30 is constant between the pad part and between the non-pad part. Accordingly, the display region can be increased since the widths d11 and d12 of the outer black matrix 32 can be relatively narrowed. Meanwhile, the adhesive strength between the substrates 20 and 30 in the pad part may be maintained at a high level because of the sealant 41 overlapping the gaps between the protrusions.

Figure 12:
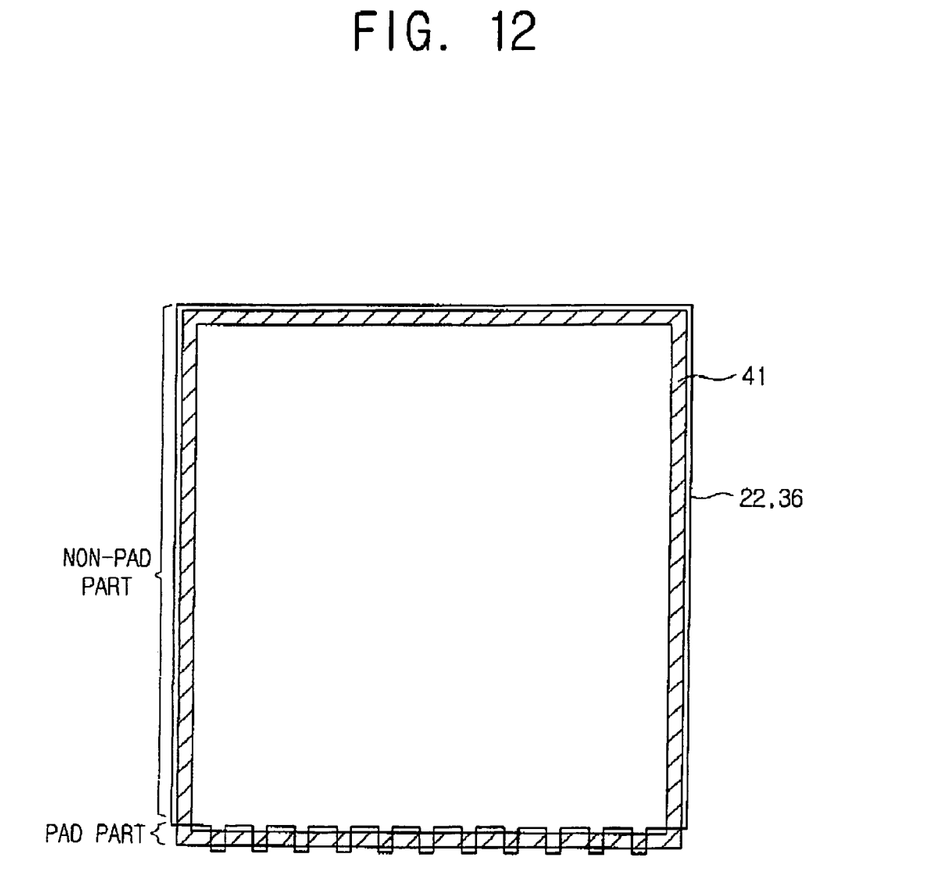
FIG. 12 is a top plan view illustrating a fifth exemplary embodiment of an arrangement of orientation films and a sealant according to the present invention.

FIG. 12 is a top plan view illustrating a fifth exemplary embodiment of an arrangement of an orientation film and a sealant according to the present invention. Referring to FIG. 12, the circumferences of the orientation films 22 and 36 in the pad part are formed with protrusions, such as protrusions 22a, 36a as previously described, and the sealant 41 is formed along the protrusions, overlapping both the protrusions and the gaps between the protrusions. The circumferences of the orientation films 22 and 36 in the non-pad part are not formed with irregular shapes and the sealant 41 is overlapped with the orientation films 22 and 36.

With this configuration, the strong adherence between both substrates 20, 30 can be maintained in the pad part, via the sealant 41 overlapping the gaps between the protrusions, and the width of the second outer black matrix 32b can be narrowed in the non-pad part, thereby widening the display region.

As described above, the present invention provides a displaying apparatus featuring an excellent adherence between both substrates while preventing the display region from being narrowed.

Although the present invention has been described in connection with the exemplary embodiments illustrated in the accompanying drawings, it should be understood that the present invention is not limited thereto and those skilled in the art can make various modifications and changes without departing from the scope of the invention. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A displaying apparatus comprising:
a first substrate having a first orientation film;
a second substrate having a second orientation film corresponding to the first orientation film, oppositely facing the first substrate; and
a sealant having at least a part overlapped with circumferential regions of the first and second orientation films, the sealant adhering the first substrate to the second substrate, wherein
the circumferential regions of the first and second orientation films overlapped with the sealant comprise:
a first circumferential region disposed along a first side of each of the first and second orientation films;
a second circumferential region disposed along a second side of each of the first and second orientation films; and
a third circumferential region disposed along a third side of each of the first and second orientation films,
protrusions are formed protruding along planar directions of the first and second substrates,
the protrusions are formed only in the first circumferential region, the second circumferential region and the third circumferential region of each of the first and second orientation films, and
a gap is formed between each pair of adjacent protrusions, the gap having a width measured along a first direction which is greater than a width of the sealant measured along a second direction perpendicular to the first direction.

2. The displaying apparatus as claimed in claim 1, wherein the first substrate is provided with a pad part for connection to an external circuit, the pad part disposed adjacent to a fourth circumferential region along a fourth side of each of the first and second orientation films; and
a part of the sealant positioned in the pad part does not overlap the first and second orientation films.

3. The displaying apparatus as claimed in claim 1, wherein the protrusions comprise a plurality of rectangular shaped protrusions.

4. The displaying apparatus as claimed in claim 1, wherein an adherence of the sealant to the first and second substrates when the sealant is positioned adjacent gaps between the protrusions is greater than an adherence of the sealant to the first and second substrates when the sealant is positioned adjacent the protrusions.

5. The displaying apparatus as claimed in claim 1, further comprising a gap between each pair of adjacent protrusions, at least one gap having a width greater than a width of each protrusion.

6. The displaying apparatus as claimed in claim 5, wherein the width of the at least one gap is approximately twice the width of each protrusion.

7. The displaying apparatus as claimed in claim 1, further comprising a gap between each pair of adjacent protrusions, the gap having a width greater than a width of each protrusion.

8. The displaying apparatus as claimed in claim 1, wherein
the first substrate is provided with a pad part for connection to an external circuit, and
a part of the sealant positioned in the pad part does not overlap the first and second orientation films.

9. A liquid crystal display panel comprising:
a first substrate having a first orientation film;
a second substrate having a second orientation film;
a liquid crystal layer positioned between the first orientation film and the second orientation film; and
a sealant adhering the first substrate to the second substrate and enclosing the liquid crystal layer therein, a first portion of the sealant overlapping the first and second orientation films, and a second portion of the sealant not overlapping the first and second orientation films, wherein
the first portion of the sealant surrounds only three sides of a display region of the liquid crystal display panel,
at least one of the first orientation film and the second orientation film comprises protrusions, and
a gap is formed between each pair of adjacent protrusions, the gap having a width measured along a first direction which is greater than a width of the sealant measured along a second direction perpendicular to the first direction.

10. The liquid crystal display panel of claim 9 wherein the second portion of the sealant is provided adjacent a pad part of the liquid crystal display panel connecting to an external circuit.

11. The liquid crystal display panel of claim 9 wherein an adherence of the sealant in the first portion is less than an adherence of the sealant in the second portion.

12. The liquid crystal display panel of claim 9 wherein the first and second orientation films include a circumferential region having the plurality of protrusions, the first portion of the sealant overlapping protrusions of the plurality of protrusions, and the second portion of the sealant overlapping gaps between the protrusions.

13. The liquid crystal display panel of claim 9 further comprising an outer black matrix formed on an outer circumferential region of the second substrate, the outer black matrix comprising a first outer black matrix having a first width and a second outer black matrix having a second width less than the first width, the second outer black matrix surrounding three sides of a display region of the liquid crystal display panel.

14. The liquid crystal display panel of claim 9 wherein a cross-section of the sealant includes both the first portion of the sealant and the second portion of the sealant.

15. The liquid crystal display panel of claim 9 further comprising the gap between each pair of adjacent protrusions, wherein a width of the gap is approximately twice the width of each protrusion of the plurality of protrusions.

16. The liquid crystal display panel of claim 9, further comprising the gap between each pair of adjacent protrusions, the gap having a width greater than a width of each protrusion.

* * * * *